(12) United States Patent
Lin

(10) Patent No.: US 7,436,914 B2
(45) Date of Patent: Oct. 14, 2008

(54) METHODS AND APPARATUS FOR PROVIDING TELEVISION SIGNALS

(75) Inventor: Che-Li Lin, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 612 days.

(21) Appl. No.: 11/160,803

(22) Filed: Jul. 11, 2005

(65) Prior Publication Data

US 2007/0011719 A1 Jan. 11, 2007

(51) Int. Cl.
*H04L 1/02* (2006.01)
*H04L 27/00* (2006.01)
*H04L 27/08* (2006.01)
*H03K 9/00* (2006.01)

(52) U.S. Cl. .................. 375/347; 375/316; 375/345; 725/68; 725/100

(58) Field of Classification Search .................. 375/347, 375/316, 345; 725/100, 139, 131; 348/139
See application file for complete search history.

(56) References Cited

U.S. PATENT DOCUMENTS

| 5,678,060 | A * | 10/1997 | Yokoyama et al. .......... 709/212 |
| 6,373,527 | B1 | 4/2002 | Lee |
| 2002/0150185 | A1 | 10/2002 | Meehan et al. |
| 2002/0163593 | A1 * | 11/2002 | Liu et al. .................. 348/614 |
| 2003/0206539 | A1 * | 11/2003 | Harris ...................... 370/335 |
| 2004/0003395 | A1 | 1/2004 | Srinivas |
| 2004/0136406 | A1 * | 7/2004 | Kuramoto .................. 370/503 |

FOREIGN PATENT DOCUMENTS

| CN | 1107406 C | 4/2003 |
| EP | 1 331 782 A2 | 7/2003 |
| WO | WO 03/089802 A1 | 8/2003 |

\* cited by examiner

*Primary Examiner*—Kevin M. Burd
*Assistant Examiner*—Brian J Stevens
(74) *Attorney, Agent, or Firm*—Winston Hsu

(57) ABSTRACT

A method for providing television signals is disclosed including the steps of: receiving signals utilizing a first antenna and a second antenna; generating a first signal quality indicator corresponding to signals from the first antenna; generating a second signal quality indicator corresponding to signals from the second antenna; and selectively producing only a main picture signal or the main picture signal together with a sub picture signal utilizing the signals from the first and second antennas according to the first and second signal quality indicators.

16 Claims, 3 Drawing Sheets

METHODS AND APPARATUS FOR PROVIDING TELEVISION SIGNALS

BACKGROUND

The present invention relates to digital televisions, and more particularly, to methods and apparatus for providing television signals by employing antenna diversity mechanisms.

As conventional analog video broadcasting is transforming into digital video broadcasting (DVB), digital televisions or set-top boxes (STB) have become popular household appliances. Many families may have two or more televisions in their houses. Those televisions may be installed in the living room, bedroom, or even in the bathroom.

In the related art, a common antenna is typically arranged outdoors or on the rooftop for receiving digital television signals. The received digital television signals are then transmitted to the television or set-top box (STB) in the house through cables wired to the common antenna. The outdoor antenna has a good receiving performance but is usually large and inconvenient to install. Moreover, the complexity and cost of wiring the cables are thorny problems.

Additionally, as information intensity increases, televisions only able to display a single picture may not satisfy the requirement of TV users any more. In view of this, supporting the picture-in-picture (PIP) function is a desirable feature for digital televisions. There is, therefore, a need for methods and apparatus that provide television signals with PIP function support.

SUMMARY OF THE INVENTION

It is therefore an objective of the claimed invention to provide methods and apparatus for providing television signals to solve the above-mentioned problems.

An exemplary embodiment of a receiving apparatus for providing television signals is disclosed comprising a first antenna; a second antenna; a first signal quality measuring device electrically connected to the first antenna, for generating a first signal quality indicator corresponding to signals from the first antenna; a second signal quality measuring device electrically connected to the second antenna, for generating a second signal quality indicator corresponding to signals from the second antenna; and a decision unit electrically connected to the first and second signal quality measuring devices, for controlling the receiving apparatus to selectively produce only a main picture signal or the main picture signal together with a sub picture signal utilizing the signals from the antennas according to the first and second signal quality indicators.

An exemplary embodiment of a method for providing television signals is disclosed comprising the steps of: receiving signals utilizing a first antenna and a second antenna; generating a first signal quality indicator corresponding to signals from the first antenna; generating a second signal quality indicator corresponding to signals from the second antenna; and selectively producing only a main picture signal or the main picture signal together with a sub picture signal utilizing the signals from the first and second antennas according to the first and second signal quality indicators.

An exemplary embodiment of an apparatus for providing television signals is disclosed comprising: a first antenna; a second antenna; a first demodulator electrically connected to the first antenna, for generating a first signal quality indicator corresponding to signals from the first antenna, and for demodulating the signals from the first antenna to produce a first demodulated signal; a second demodulator electrically connected to the second antenna, for generating a second signal quality indicator corresponding to signals from the second antenna, and for demodulating the signals from the second antenna to produce a second demodulated signal; a first backend processor electrically connected to the first demodulator, for generating a third signal quality indicator according to the first demodulated signal; a second backend processor electrically connected to the second demodulator, for generating a fourth signal quality indicator according to the second demodulated signal; and a decision unit electrically connected to the first and second demodulators and the first and second backend processors, for controlling the apparatus to selectively produce only a main picture signal or both the main picture signal and a sub picture signal utilizing the signals from the first and second antennas according to at least two of the first, second, third and forth signal quality indicators.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
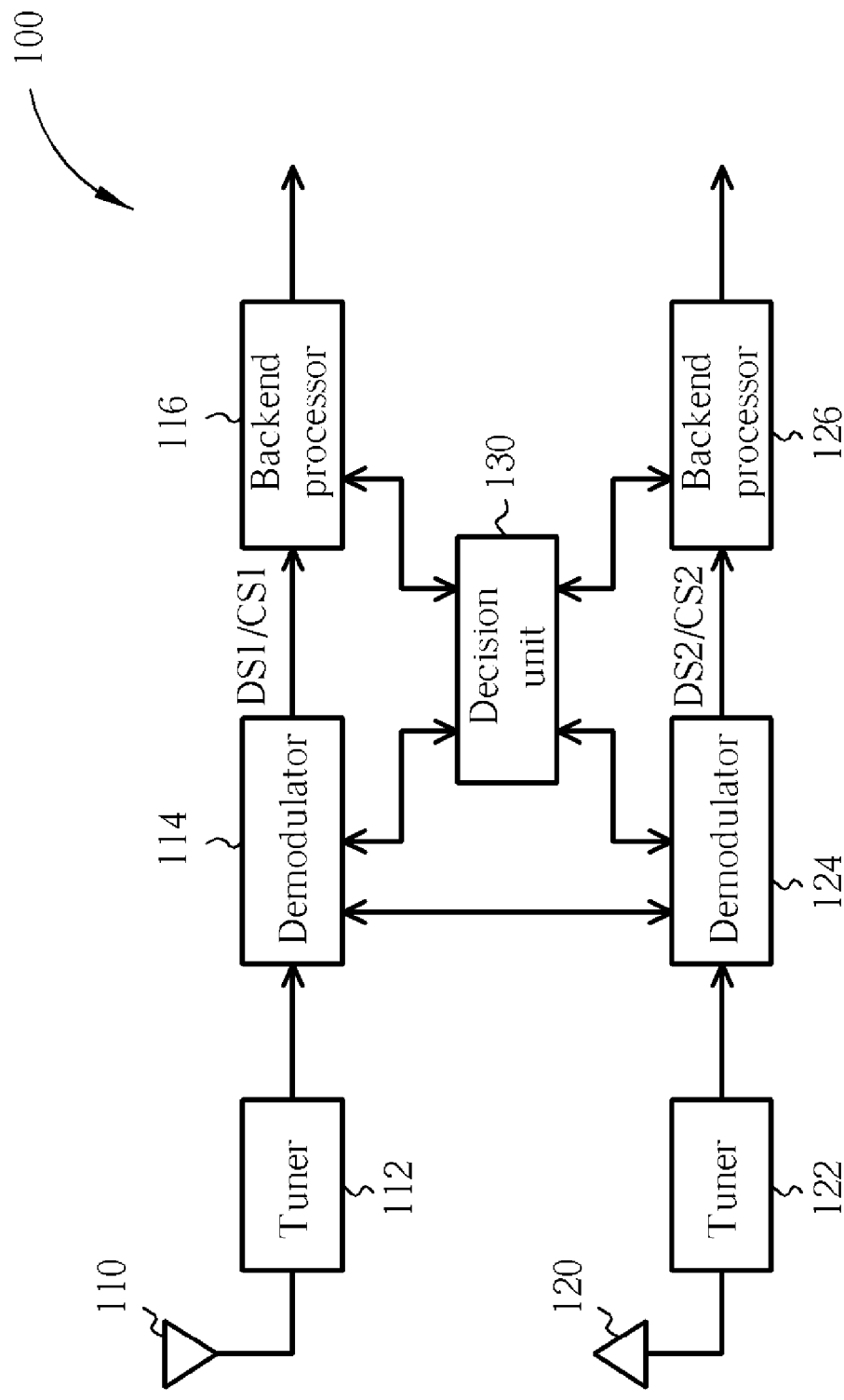
FIG. 1 is a functional block diagram of a receiving apparatus according to one embodiment of the present invention.

Please refer to FIG. 1, which shows a functional block diagram of a receiving apparatus 100 according to one embodiment of the present invention. As shown, the receiving apparatus 100 comprises first and second antennas 110 and 120, first and second tuners 112 and 122, first and second demodulators 114 and 124, first and second backend processors 116 and 126, and a decision unit 130. In practical applications, the receiving apparatus 100 may be a set-top box (STB) or a receiver of a digital television. In the latter case, both the first and second antennas 110 and 120 may be arranged inside the digital television. Note that separate functional blocks of the receiving apparatus 100 may be implemented with distinct circuit elements or integrated into a single chip unit.

Hereinafter, operations of the receiving apparatus 100 will be explained with reference to FIG. 2.

Figure 2:
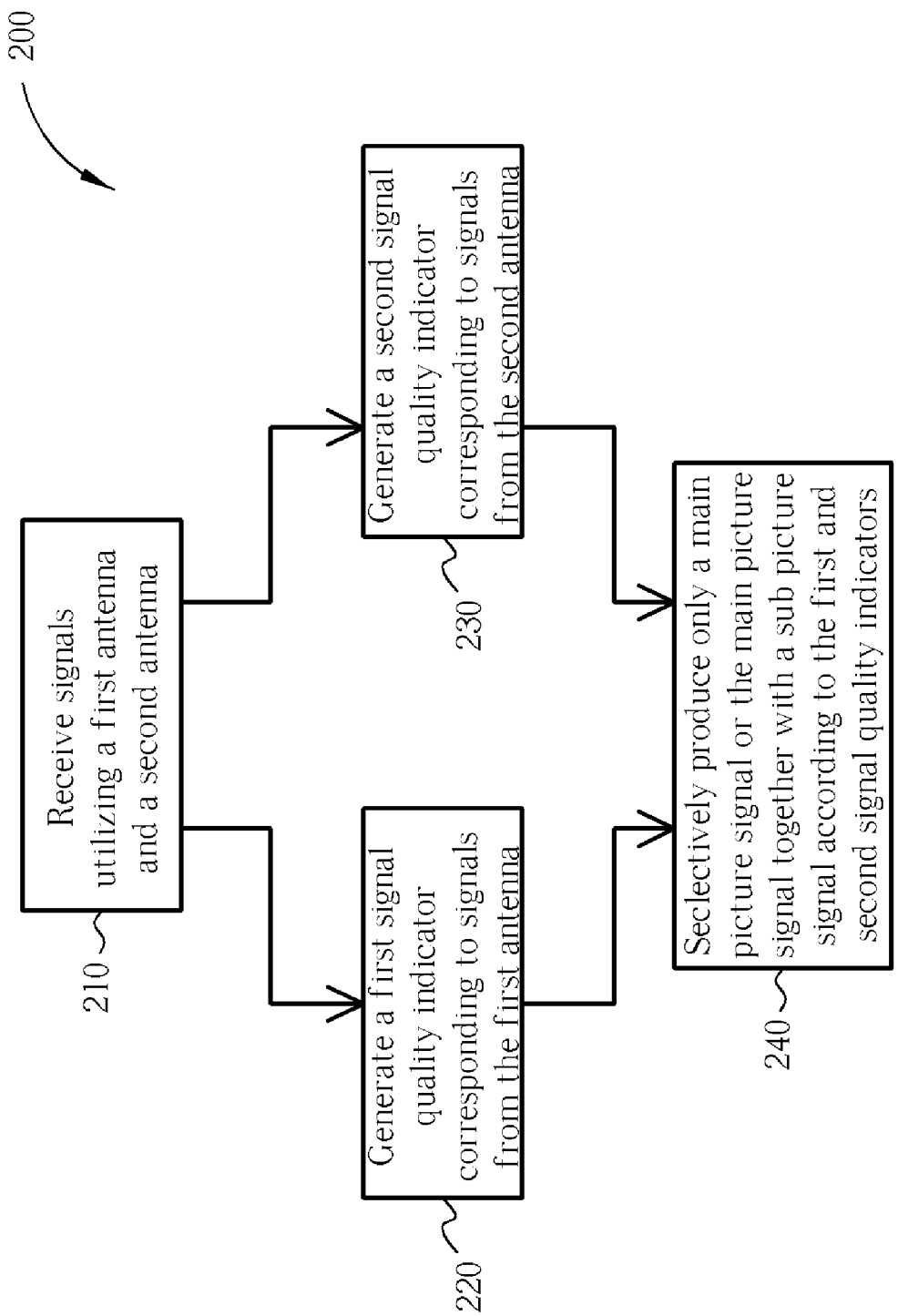
FIG. 2 is a flowchart illustrating a method for providing television signals according to one embodiment of the present invention.

FIG. 2 is a flowchart 200 illustrating a method for providing television signals according to one embodiment of the present invention.

In step 210, the first and second antennas 110 and 120 are utilized for receiving digital television signals. In this embodiment, each of the first and second antennas 110 and 120 may be an omni-directional antenna, a directional antenna, or a smart antenna.

Next, the first turner 112 is utilized to down convert signals received from the first antenna 110 and the second tuner 122 is utilized to down convert signals received from the second antenna 120. In practice, both the first and second tuners 112 and 122 can be implemented with various architectures that are known in the art such as the direct-conversion architecture or super heterodyne architecture.

In step 220, a first signal quality measuring device generates a first signal quality indicator SQ1 corresponding to signals from the first antenna 110. A second signal quality measuring device generates a second signal quality indicator SQ2 corresponding to signals from the second antenna 120 in step 230.

In one embodiment, the first signal quality measuring device is the first demodulator 114 while the second signal quality measuring device is the second demodulator 124. In such a scheme, the first signal quality indicator SQ1 may be a bit error rate (BER) of the signals from the first antenna 110 calculated by the first demodulator 114 while demodulating the signals to produce a first demodulated signal DS1. Similarly, the second signal quality indicator SQ2 may be a BER of the signals from the second antenna 120 calculated by the second demodulator 124 while demodulating the signals to produce a second demodulated signal DS2. The BER is merely an example of the signal quality indicator rather than a limitation of the present invention. In practice, both the first and second signal quality indicators SQ1 and SQ2 can be represented in a variety of ways that are known in the art, such as the signal-to-noise ratio (SNR).

In another embodiment, the first signal quality measuring device is the first backend processor 116 and the second signal quality measuring device is the second backend processor 126. In this scheme, the first signal quality indicator SQ1 may be a CRC error rate of the first demodulated signal DS1 obtained by the first backend processor 116 while decoding the first demodulated signal DS1. The second signal quality indicator SQ2 may be a CRC error rate of the second demodulated signal DS2 obtained by the second backend processor 126 while decoding the second demodulated signal DS2. Note that utilizing the CRC error rate to be the signal quality indicator is merely an example rather than a limitation of the present invention.

In step 240, the decision unit 130 controls the receiving apparatus 100 to selectively produce only a main picture signal or the main picture signal together with a sub picture signal according to the first and second signal quality indicators SQ1 and SQ2. In another aspect, the decision unit 130, in step 240, determines the antenna diversity mechanism of the receiving apparatus 100, or determines whether to support the picture-in-picture (PIP) function of the corresponding digital television.

For convenience of description, the first and second signal quality indicators SQ1 and SQ2 are herein assumed to be the CRC error rate of the first demodulated signal DS1 and the CRC error rate of the second demodulated signal DS2, respectively. In this embodiment, lower signal quality indicator represents better signal quality. The operations of step 240 will be further explained with reference to FIG. 3 below.

Figure 3:
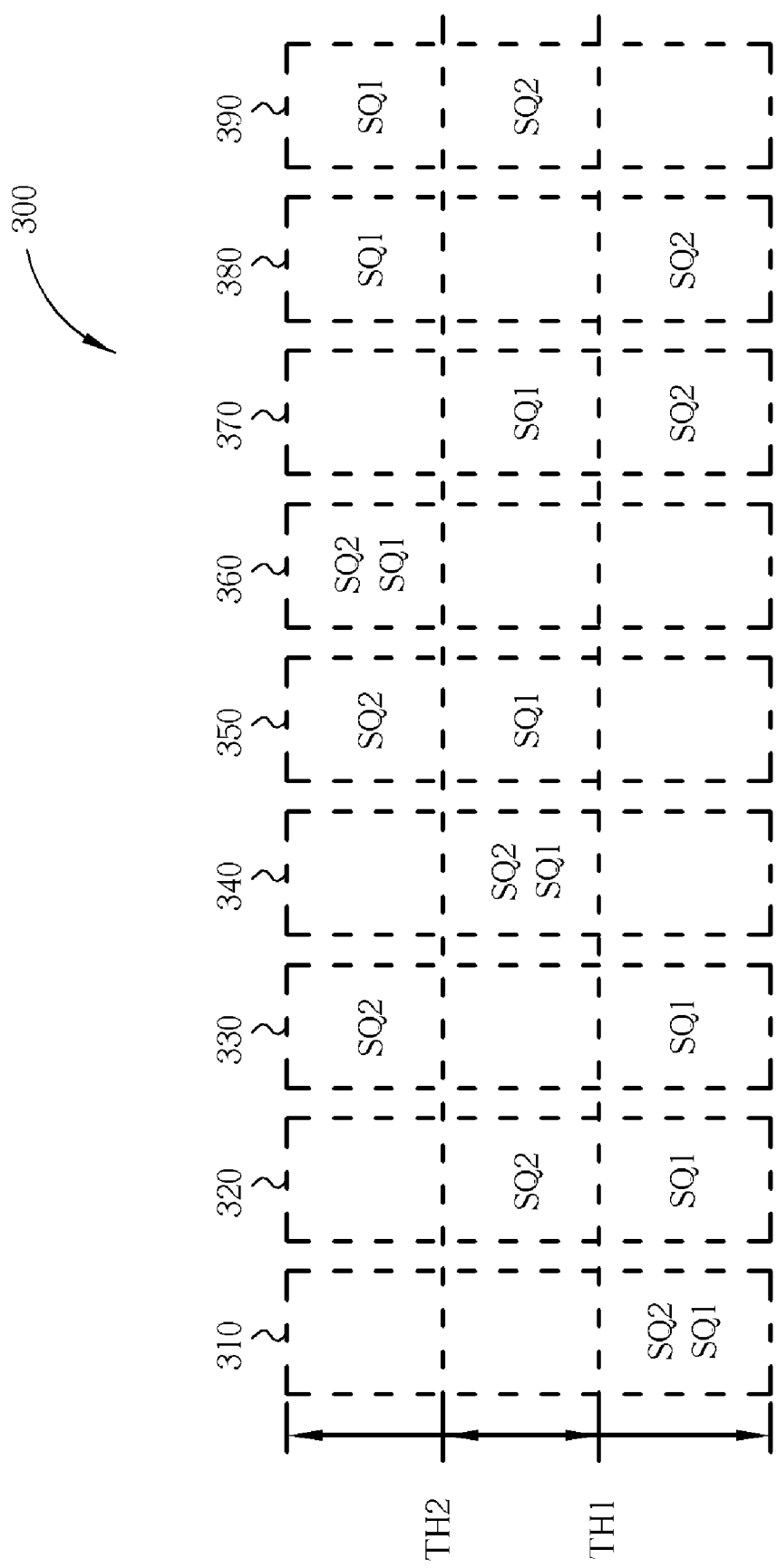
FIG. 3 is a diagram showing different schemes of the first and second signal quality indicators SQ1 and SQ2 according to one embodiment of the present invention.

FIG. 3 shows different schemes of the first and second signal quality indicators SQ1 and SQ2 according to one embodiment of the present invention. In FIG. 3, a first threshold value TH1 represents a signal quality requirement corresponding to a main picture while a second threshold value TH2 represents a signal quality requirement corresponding to a sub picture. Schemes 310 through 390 represent nine different combinations of the first and second signal quality indicators SQ1 and SQ2. Generally, if the first signal quality indicator SQ1 is less than the first threshold value TH1, this represents that the signals from the first antenna 110 are qualified to be utilized to produce a main picture signal or a sub picture signal. If the first signal quality indicator SQ1 is between the first threshold value TH1 and the second threshold value TH2, this represents that the signals from the first antenna 110 are qualified to be utilized to produce a sub picture signal but not qualified to be utilized to produce a main picture signal.

Therefore, if the first signal quality indicator SQ1 is less than the first threshold value TH1 and the second signal quality indicator SQ2 is less than the second threshold value TH2, such as the schemes 310 and 320, then the decision unit 130 permits the first demodulator 114 to co-operate with the first backend processor 116 to generate a main picture signal according to the signals from the first antenna 110. Simultaneously, the decision unit 130 also permits the second demodulator 124 to co-operate with the second backend processor 126 to generate a sub picture signal according to the signals from the second antenna 120.

Analogously, if the first signal quality indicator SQ1 and the second signal quality indicator SQ2 conform to the scheme 370, the decision unit 130 permits the second demodulator 124 to co-operate with the second backend processor 126 to generate a main picture signal according to the signals from the second antenna 120 and permits the first demodulator 114 to co-operate with the first backend processor 116 to generate a sub picture signal according to the signals from the first antenna 110.

Briefly, when the first and second signal quality indicators SQ1 and SQ2 meet the scheme 310, 320 or 370, the receiving apparatus 100 produces both a main picture signal and a sub picture signal under the control of the decision unit 130, i.e. the picture-in-picture (PIP) function is supported. In such a scheme, if both the main picture signal and the sub picture signal are located in a same radio frequency channel, the decision unit 130 preferably controls the first and second demodulators 114 and 124 to combine the signals from the first and second antennas 110 and 120 to produce a first combined signal CS1 and a second combined signal CS2, respectively. Then, the first backend processor 116 is employed to generate a main picture signal according to the first combined signal CS1, and the second backend processor 126 is employed to generate a sub picture signal according to the second combined signal CS2. Since the signal combination operations are well known in the art, further details are omitted for brevity. As a result, the image quality of both the main picture signal and the sub picture signal are improved.

On the other hand, if both the first and second signal quality indicators SQ1 and SQ2 are not less than a first threshold value TH1 or at least one out of SQ1 and SQ2 is not less than a second threshold value TH2, such as in the schemes 330, 340, 350, 360, 380, and 390, then the decision unit 130 controls the receiving apparatus 100 to produce only a main picture signal in step 240. For example, in the case of the scheme 330, the decision unit 130 may simply select the first backend processor 116 to produce a main picture signal according to the first demodulated signal DS1 generated by the first demodulator 114. Similarly, in the case of the scheme 380, the decision unit 130 may simply select the second backend processor 126 to produce a main picture signal according to the second demodulated signal DS2 generated by the second demodulator 124. In another embodiment, when the SQ1 and SQ2 meet one of the schemes 330, 340, 350, 360, 380, and 390, the decision unit 130 controls the first and second demodulators 114 and 124 to combine the signals from the first and second antennas 110 and 120 to produce a combined signal which may have a better signal quality due to the gain of diversity combining. Then, the decision unit 130 selects one of either the first or second backend processors 116 and 126 to generate a main picture signal according to the combined signal. In other words, the PIP function is not supported in such schemes.

As in the previous descriptions, in step 240, the antenna diversity mechanism of the receiving apparatus 100 may instead be determined by the signal quality indicators generated from the first and second demodulators 114 and 124. In practice, the decision unit 130 may adaptively adjust the antenna diversity mechanism of the receiving apparatus 100 to optimize the image quality of the output signals of the receiving apparatus 100.

Note that the decision unit 130 evaluating two signal quality indicators to determine the antenna diversity mechanism of the receiving apparatus 100 is merely for illustration purposes rather than limiting the implementations of the present invention. In practice, the number of signal quality indicators is a design choice and not a restriction.

For example, in another embodiment, the first demodulator 114 generates a first signal quality indicator SQ1' corresponding to signals from the first antenna 110; the second demodulator 124 generates a second signal quality indicator SQ2' corresponding to signals from the second antenna 120; the first backend processor 116 generates a third signal quality indicator SQ3' according to the first demodulated signal DS1 from the first demodulator 114; and the second backend processor 126 generates a fourth signal quality indicator SQ4' according to the second demodulated signal DS2 from the second demodulator 124. In this embodiment, the decision unit 130 controls the receiving apparatus 100 to selectively produce only a main picture signal or both the main picture signal and a sub picture signal according to the first, second, third and forth signal quality indicators SQ1', SQ2', SQ3', and SQ4'.

For example, when the SQ1' and SQ3' are respectively less than threshold values TH1' and TH3', which correspond to the signal quality requirement of a main picture signal, then the decision unit 130 can accordingly determine that the signals from the first antenna 110 are qualified to be utilized to produce a main picture signal. If the SQ1' and SQ3' are respectively less than threshold values TH2' and TH4', which correspond to the signal quality requirement of a sub picture signal, but not less than the threshold values TH1' and TH3', then the decision unit 130 can determine that the signals from the first antenna 110 are only qualified to be utilized to produce a sub picture signal but not a main picture signal. The decision unit 130 can evaluate the signal quality of the signals from the second antenna 120 according to the signal quality indicators SQ2' and SQ4' in the same way as the SQ1' and SQ3'. Other details about the decision making of the antenna diversity mechanism of the receiving apparatus 100 made by the decision unit 130 are substantially the same as for the other embodiments and repeated descriptions are therefore omitted.

In practical applications, more than two antennas with more than two signal processing modules associated with the antennas may be implemented. Those of ordinary skill in the art can readily apply the concept and spirit of the present invention to such applications so details are omitted here.

The video quality of the digital television is improved by applying the antenna diversity mechanisms disclosed previously, so that the common antenna installed outdoors is no longer required. As a result, the wiring between the common antenna and the digital television can be omitted accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving apparatus for providing television signals, comprising:
    a first antenna;
    a second antenna;
    a first signal quality measuring device electrically connected to the first antenna for generating a first signal quality indicator corresponding to signals from the first antenna;
    a second signal quality measuring device electrically connected to the second antenna for generating a second signal quality indicator corresponding to signals from the second antenna, wherein the first and second signal quality measuring devices are respectively first and second demodulators capable of generating signal quality indicators;
    a decision unit electrically connected to the first and second signal quality measuring devices for controlling the receiving apparatus to selectively produce only a main picture signal or the main picture signal together with a sub picture signal utilizing the signals from the antennas according to the first and second signal quality indicators;
    a first backend processor electrically connected to the first demodulator; and
    a second backend processor electrically connected to the second demodulator;
    wherein if the first signal quality indicator is less than a first threshold value, and the second signal quality indicator is less than a second threshold value, then the decision unit permits the first demodulator to co-operate with the first backend processor to generate the main picture signal according to the signals from the first antenna, and also permits the second demodulator to co-operate with the second backend processor to generate the sub picture signal according to the signals from the second antenna.

2. The receiving apparatus of claim 1, wherein the first and second antennas are utilized for receiving digital television signals.

3. The receiving apparatus of claim 1, wherein if the main picture signal and the sub picture signal are located in a same radio frequency channel, then the decision unit further controls the first and second demodulators to combine the signals from the first and second antennas to produce a first combined signal and a second combined signal, respectively;
    wherein the first backend processor generates the main picture signal according to the first combined signal, and the second backend processor generates the sub picture signal according to the second combined signal.

4. The receiving apparatus of claim 1, wherein if both the first and second signal quality indicators are not less than a first threshold value or at least one of the first and second signal quality indicators is not less than a second threshold value, then the decision unit controls the first and second demodulators to combine the signals from the first and second antennas to produce a combined signal and selects one of the first and second backend processors to generate the main picture signal according to the combined signal.

5. The receiving apparatus of claim 1, wherein the first signal quality indicator corresponds to a bit error rate (BER) of the signals from the first antenna, and the second signal quality indicator corresponds to a BER of the signals from the second antenna.

6. A receiving apparatus for providing television signals, comprising:

a first antenna;

a second antenna;

a first signal quality measuring device electrically connected to the first antenna for generating a first signal quality indicator corresponding to signals from the first antenna;

a second signal quality measuring device electrically connected to the second antenna for generating a second signal quality indicator corresponding to signals from the second antenna, wherein the first and second signal quality measuring devices are respectively first and second backend processors;

a first demodulator electrically connected to the first antenna and the first backend processor for demodulating the signals from the first antenna to produce a first demodulated signal to the first backend processor;

a second demodulator electrically connected to the second antenna and the second backend processor for demodulating the signals from the second antenna to produce a second demodulated signal to the second backend processor; and a decision unit electrically connected to the first and second signal quality measuring devices for controlling the receiving apparatus to selectively produce only a main picture signal or the main picture signal together with a sub picture signal utilizing the signals from the antennas according to the first and second signal quality indicators;

wherein if the first signal quality indicator is less than a first threshold value, and the second signal quality indicator is less than a second threshold value, then the decision unit permits the first demodulator to co-operate with the first backend processor to generate the main picture signal according to the signals from the first antenna, and permits the second demodulator to co-operate with the second backend processor to generate the sub picture signal according to the signals from the second antenna.

7. The receiving apparatus of claim 6, wherein the first signal quality indicator corresponds to a CRC error rate of the first demodulated signal, and the second signal quality indicator corresponds to a CRC error rate of the second demodulated signal.

8. The receiving apparatus of claim 6, wherein if the main picture signal and the sub picture signal are located in a same radio frequency channel, then the decision unit further controls the first and second demodulators to combine the signals from the first and second antennas to produce a first combined signal and a second combined signal, respectively;

wherein the first backend processor generates the main picture signal according to the first combined signal, and the second backend processor generates the sub picture signal according to the second combined signal.

9. The receiving apparatus of claim 6, wherein if both the first and second signal quality indicators are not less than a first threshold value or at least one of the first and second signal quality indicators is not less than a second threshold value, then the decision unit controls the first and second demodulators to combine the signals from the first and second antennas to produce a combined signal and selects one of the first and second backend processors to generate the main picture signal according to the combined signal.

10. A method for providing television signals comprising the steps of:
(a) receiving signals utilizing a first antenna and a second antenna;
(b) generating a first signal quality indicator corresponding to signals from the first antenna;
(c) generating a second signal quality indicator corresponding to signals from the second antenna; and
(d) selectively producing only a main picture signal or the main picture signal together with a sub picture signal utilizing the signals from the first and second antennas according to the first and second signal quality indicators, comprising:
if the first signal quality indicator is less than the first threshold value, the second signal quality indicator is less than the second threshold value, and the main picture signal and the sub picture signal are located in a same radio frequency channel, combining the signals from the first and second antennas to produce a first combined signal and a second combined signal, producing the main picture signal according to the first combined signal, and producing the sub picture signal according to the second combined signal.

11. The method of claim 10, wherein step (a) comprises:
receiving digital television signals utilizing the first and second antennas.

12. The method of claim 10, wherein step (d) comprises:
if both the first and second signal quality indicators are not less than a first threshold value or at least one of the first and second signal quality indicators is not less than a second threshold value, combining the signals from the first and second antennas to produce a combined signal; and
producing the main picture signal according to the combined signal.

13. The method of claim 10, wherein the first signal quality indicator corresponds to a bit error rate (BER) of the signals from the first antenna, and the second signal quality indicator corresponds to a BER of the signals from the second antenna.

14. The method of claim 10, wherein step (b) comprises generating the first signal quality indicator utilizing a first demodulator, and step (c) comprises generating the second signal quality indicator utilizing a second demodulator.

15. The method of claim 10, farther comprising:
demodulating the signals from the first antenna to produce a first demodulated signal; and
demodulating the signals from the second antenna to produce a second demodulated signal;
wherein step (b) comprises generating the first signal quality indicator according to the first demodulated signal, and step (c) comprises generating the second signal quality indicator according to the second demodulated signal.

16. The method of claim 15, wherein the first signal quality indicator corresponds to a CRC error rate of the first demodulated signal, and the second signal quality indicator corresponds to a CRC error rate of the second demodulated signal.

* * * * *